US006654840B1

(12) United States Patent
Gendo et al.

(10) Patent No.: US 6,654,840 B1
(45) Date of Patent: Nov. 25, 2003

(54) CONNECTION CABLE IDENTIFICATION MECHANISM

(75) Inventors: Katsunori Gendo, Tokyo (JP); Toshimichi Sugai, Tokyo (JP)

(73) Assignee: Sega Enterprises, Ltd. (JP)

( * ) Notice: Subject to any disclaimer, the term of this patent is extended or adjusted under 35 U.S.C. 154(b) by 0 days.

(21) Appl. No.: 09/463,056

(22) PCT Filed: May 10, 1998

(86) PCT No.: PCT/JP99/02421

§ 371 (c)(1), (2), (4) Date: Jan. 19, 2000

(87) PCT Pub. No.: WO99/60464

PCT Pub. Date: Nov. 25, 1999

(30) Foreign Application Priority Data

May 20, 1998 (JP) .......................................... 10-138644
May 19, 1998 (JP) .......................................... 10-136215

(51) Int. Cl.$^{7}$ ................................................ G06F 13/00
(52) U.S. Cl. ........................................ 710/300; 439/620
(58) Field of Search ................................ 710/102, 100, 710/9, 300, 302, 72, 768, 301, 16, 10; 439/418, 620; 375/222; 713/310

(56) References Cited

U.S. PATENT DOCUMENTS 5,846,099 A * 12/1998 Hiruma et al.
5,872,999 A * 2/1999 Koizumi et al.
5,909,596 A * 6/1999 Mizuta ........................ 710/63
5,963,652 A * 10/1999 Tran et al. .................. 381/109
6,307,880 B1 * 10/2001 Evans et al. ................ 375/222
6,321,340 B1 * 11/2001 Shin et al. .................. 713/310

FOREIGN PATENT DOCUMENTS

| | | |
|---|---|---|
| JP | 2-228717 | 9/1990 |
| JP | 3-103571 | 10/1991 |
| JP | 6-75901 | 3/1994 |
| JP | 8-1572 | 11/1996 |
| WO | WO 96/12250 | 4/1996 |

* cited by examiner

*Primary Examiner*—Rupal Dharia
*Assistant Examiner*—Kim T. Huynh
(74) *Attorney, Agent, or Firm*—Dickstein Shapiro Morin & Oshinsky LLP

(57) ABSTRACT

An information-processing unit is provided, which is connected to an external unit through a connection cable, comprising a connector with multiple contact pins, and a recognition means for sensing a specific contact pin of the multiple contact pins in the connector and recognizing the type of connection cable to be accommodated in the connector. A connector is provided, comprising an upper surface member, rear wall and lower surface member with an open portion formed at the front into which a plug is inserted, as well as a plate member in parallel from the rear wall to the lower surface member, and a contact pin on the upper surface of the plate member, in the vicinity of the lower surface member, and a standing wall at the end of the plate member on the upper surface side of the plate member. According to this invention, not only can the setting of the information-processing unit be automatically changed to a setting compatible with the external unit, it is also possible to prevent the destruction of the semiconductor in the connector or the abnormal operation of the information-processing unit, which is caused by static electricity passing through the contact pin.

7 Claims, 15 Drawing Sheets

State in using a video game player of an embodiment according to the invention

State in using a video game player of an embodiment according to the invention

Shematic view of a connector for the video game player of an embodiment according to the present invention Schematic view of a connection cable for the video game player of an embodiment according to the present invention Block diagram of a video game player console of an embodiment according to the present invention Flowchart of a switching mode of the video game player of an embodiment according to the present invention The connection by a connection cable for a personal computer of an embodiment according to the present invention Connection of RGB21P connection cable for a telecision set according to the present invention Connection of an AV stero cable for a television set according to the present invention Connection of an S-terminal and stero audio cable for a television set according to the present invention Connection of an RF converter for television according to the present invention External appearance of a connector according to the present invention Cross-sectional view of the connector along line A-A according to the present invention Explanatory drawing of the connector according to the present invention A plug of an embodiment according to the present invention Cross-sectional view of the plug along line B-B according to the present invention Insertion of the plug into the connector according to the present invention Cross-sectional view of the connector along line A-A other embodiment according to the present invention Explanatory drawing of a connector of other embodiment according to the present invention Cross-sectional view of conventional connector Explanatory drawing of conventional connector

CONNECTION CABLE IDENTIFICATION MECHANISM

BACKGROUND OF THE INVENTION

1. Field of the Invention

This invention relates to an information-processing unit, a connection cable, and electrostatic-shielded connectors and plugs used for the information-processing unit.

2. Description of the Related Art

A video game players as information-processing units outputs video and audio data of video games to a display unit, wherein the console of the video game player body is connected to a display unit such as a television video receiver through a connection cable. In this case, a signaling system defines signals which can be input to the display unit, and the video game player console must output signals defined by the signaling system that is compatible with the display unit to be used.

For example, the NTSC signaling system and the PAL signaling system are available to the television video receiver. When the television video receiver to be used uses the NTSC signaling system, the video game player console must output signals that are compatible with the NTSC signaling system.

In addition, a television video receiver has its own unique signaling system, for example, the composite video signaling system or the RGB signaling system. The television video receiver has an RCA input terminal and an S input terminal, so the video game player console must output a video signal compatible with the signaling system and input terminals of the television video receiver.

With the recent increased diffusion of personal computers, there has been a gradual increase in the number of users who wish to have their video game players connected to the display units of their personal computers, when so they can use their video game players. However, the VGA signaling system as a signaling system of the display unit of personal computer is greatly different from the signaling system of television video receivers.

Therefore, when the video game player console is connected to the display unit of the personal computer, it must be set in advance so as to output signals compatible with the display unit of the personal computer.

In this case, when a video game player outputs a signal, which is not compatible with a display unit, a game screen is not normally displayed and guidance prompting a user to change setting cannot be displayed on the display unit. As a result, this event might cause the user to mistakenly believe that the video game player or display unit has malfunctioned, causing the user needless concerned.

On the other hand, considering connectors and plugs to be used for an information-processing unit to an external unit, as was mentioned above, an information-processing unit such as a video game player is connected to an external unit such as a display unit through a connection cable. Then, the information-processing unit transmits signals through the connection cable between a plug of the connection cable and a connector of the information-processing unit.

FIG. 19 shows a cross-sectional view of a conventional connector 180 to be used in an information-processing unit. The connector 180 is formed with a U-shaped section of an insulator, and has an open portion 182 and a vacuous portion 188, into which a plug is inserted and fitted. FIG. 19 shows the connector 180 of the surface-mounted type, which is mounted on the surface of a printed circuit board 185.

An upper shield 190 is set on the lower surface of an upper surface member 181 of the connector 180, and folded forward at the rear of the upper surface member 181. The upper shield 190 is a metallic spring member and the folded portion is pressure-welded to one end of a chassis 189, and the upper shield 190 bears the potential with respect to ground. Holes 191 are formed on the upper shield 190, into which projections of the plug to be inserted into the vacuous portion 188 are fitted, and function as a half lock for the plug.

Under the vacuous portion 188, a plate member 183 is positioned toward an open portion 182 in parallel with a printed circuit board 185, and a contact pin 186 is mounted on the upper surface of the plate member 183. The contact pin 186 pierces through a rear wall 187 of the connector 180, and is connected to conductive patterns mounted on the surface of the printed circuit board 185 by soldering.

When the plug is inserted into the connector 180, the conductive pin connected to the signal cable within the plug comes into contact with the contact pin 186 elastically, enabling transmission of the signal. A slit portion 184 between the plate member 183 and a lower surface member 192 is a guide for inserting the plug into the connector 180.

In this way, the ,information-processing unit is connected to multiple external units by means of connectors and plugs. However, not all the connectable external units are necessarily connected and the information-processing unit is frequently used with some plugs not inserted into the connectors.

In this case, it is possible to prevent foreign substances from coming into contact with any contact pin by covering all unused connectors. However, the provision of covers for all the unused connectors in an information-processing unit increases the production cost of the information-processing unit. Even if covers are provided for all the connectors, the user may not necessarily use the provided covers to cover all the unused connectors.

FIG. 20 shows a case where a foreign substance such as a bar 192 is mistakenly inserted into an open portion 182 of the connector 180. The conventional connector 180 has a structure where the distance between the open portion 182 and the contact pin 186 is short and it is easy for the mistakenly inserted bar 192 to come into contact with the contact pin 186.

If the bar 192 is charged with static electricity, when the bar 192 comes into contact with the contact pin 186, static electricity may destroy the insulated state of semiconductor devices in the information-processing unit by passing through the contact pin 186. This causes problems with the information-processing unit. The problems caused by static electricity can occur even when the fingertip of a person charged with static electricity comes into contact with the contact pin 186.

The information-processing unit is subjected to a discharge test, which tests resistance to static electricity. Usually, this discharge test is executed wherein plugs are inserted into connectors. However, measures need to be taken against static electricity under the condition where the plugs are not inserted into the connectors and the connectors are left uncovered, in order to reinforce the resistance of the connectors against static electricity.

The first object of this invention is to enable an information-processing unit to automatically recognize the connection cable to transmit signals compatible with the external unit, which is connected to the connection cable, when the connection cable is connected to an information-processing unit such as the video game player, in order to solve the problems involving the compatibility of signals to be transmitted between the above-mentioned video game player and the display unit.

The second object of this invention is to enable a simple mechanism, which can change an arrangement of conductive connector pins of the connection cable used in the information-processing unit, to identify the connection cable type, and further to provide a connection cable to transmit the signals compatible with the connected external unit.

To solve the problems involving the structure of the connector in the above information-processing unit, in which it is easy for foreign substances to come into contact with the contact pin because of the connector's open shape, the third object of this invention is to provide a connector having a structure that makes it difficult for foreign substances to come into contact with the contact pin, even when no plug is inserted into the connector and the connector is uncovered.

Furthermore, the fourth object of this invention is to provide a connector, which prevents problems caused by static electricity, if an external foreign substance is inserted into the uncovered connector without a plug inserted and comes into contact with the shield before coming into contact with the contact pin.

SUMMARY OF THE INVENTION

The above first object can be achieved by providing for the connection of an information-processing unit to an external unit through the connection cable, which comprises a connector with multiple contact pins that accommodates the connection cable, and the means of sensing the state of a specific contact pin among multiple connector contact pins and recognizing the type of connection cable to be accommodated in the connector.

According to this invention, the information-processing unit has a means of sensing the state of a specific contact pin and recognizing the type of connection cable to be accommodated in the connector. This ability enables the setting of the information-processing unit to automatically change to a setting compatible with the external unit, depending on the recognition result, and reduces the operational burden on the user.

The above second object can be achieved by providing a connection cable, one end of which is connected to the information-processing unit and the other end of which is connected to the external unit, wherein the connection cable has a connector on one end and an arrangement of conductive connector pins compliant with the connection cable type in the connector.

According to this invention, a simple mechanism, which can change the arrangement of conductive connector pins, enables the information-processing unit to recognize the connection cable type. This can simplify the configuration of the information-processing unit.

The above third object can be achieved by providing a connector comprises an upper surface member, a rear wall, a lower surface member, and an open portion at the front and into which the plug is inserted, wherein the plate member is set in parallel from the rear wall to the lower surface member in the vicinity of the lower surface member, a contact pin is set on the upper surface of the plate member and a standing wall is set on the upper surface side of the plate member in the end of the plate member.

According to this invention, the connector has a standing wall on the upper surface side in the end of the plate member so no foreign substance such as a piece of metal comes into direct contact with the contact pin even when the foreign substance is mistakenly inserted into the open portion of the connector. This prevents the passage of static electricity through the contact pin and destroying the semiconductor within the connector, or prevents abnormal operation of the information-processing unit.

The above fourth object can be achieved by providing a connector on the lower surface of the upper surface member, which comprises a shield member spanning the area from the rear wall to the open portion.

According to this invention, the connector has a shield member spanning the area from the rear wall to the open portion on the lower surface of the upper surface member, so a foreign substance comes into direct contact with the shield member before coming into contact with the contact pin even when the foreign substance is obliquely inserted into the open portion into the connector. Therefore, even if the foreign substance is charged with static electricity, the static electricity is discharged to ground through the shield member and does not cause the destruction or abnormal operation of the information-processing unit.

DESCRIPTION OF THE PREFERRED EMBODIMENTS

This invention is applied to an information-processing unit to be connected to an external unit through a connection cable, but the following embodiments explain a case where the information-processing unit is a video game player and the external unit is a display unit. A video game player is often connected to different display units through different connection cables, and the present invention is mostly applied to video game players.

Figure 1:
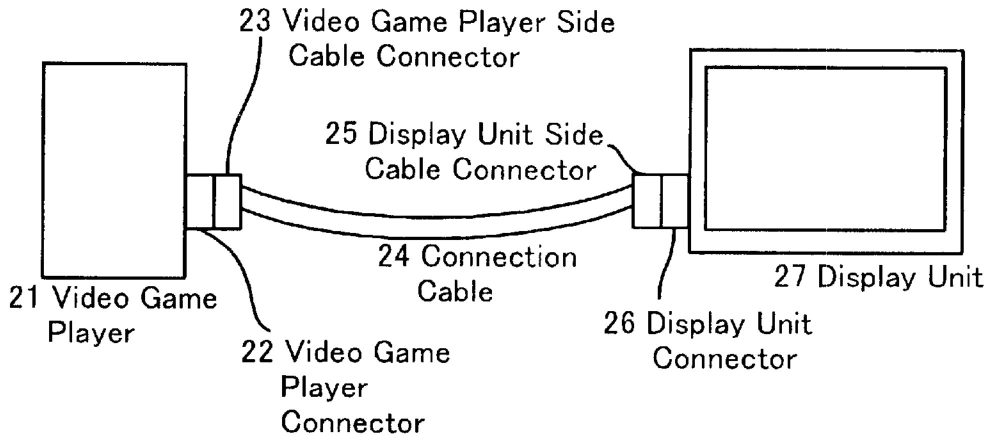
FIG. 1 is an explanatory drawing of a state in using a video game player of an embodiment according to the invention.

Hereafter, the embodiments of this invention are explained by referring to the drawings. FIG. 1 is an explanatory drawing of the state in which a video game player is used according to an embodiment of the present invention. In the video game player 21, a video game player connector 22 is connected and outputs video and audio signals depending on game contents.

A connection cable 24 has cable connector 23 to be connected to the video game player connector 22, and cable connector 25 to be connected to a display unit connector 26, and transmits signals such as a video signal to be output from the video game player 21, to the display unit 27.

The display unit 27 is a display unit of a television video receiver or a personal computer, and displays/outputs the game video and audio.

Figure 2:
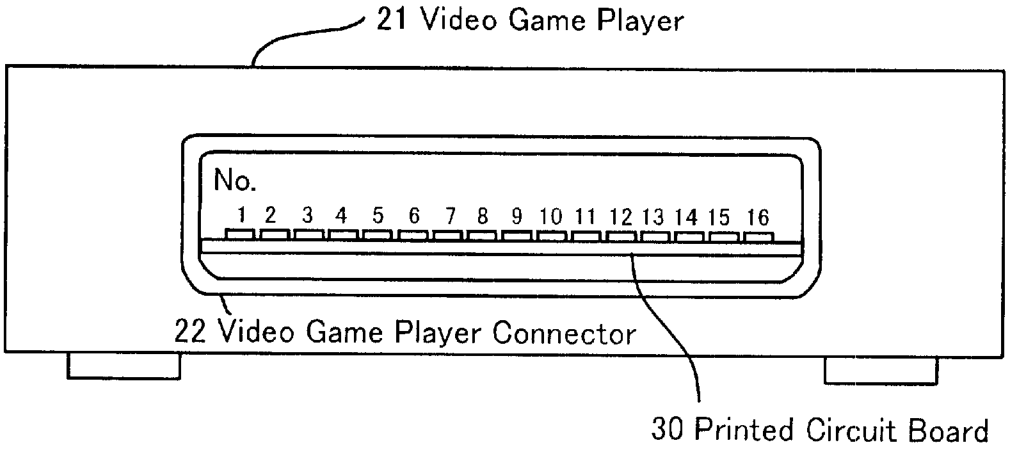
FIG. 2 is a schematic view of a connector for the video game player of an embodiment according to the present invention.

FIG. 2 is a schematic view of the connector 22 to be connected to the video game player 21 according to the present invention. The connector 22 includes a printed circuit board 30, on the upper surface of which are arranged sixteen contact pins with pin Nos. 1 to 16. These contact pins are assigned the signals listed in Table 1.

TABLE 1

| Pin No. | Signal type |
|---|---|
| 1 | Red video signal (PC & TV) |
| 2 | Green video signal (PC & TV) |
| 3 | Blue video signal (PC & TV) |
| 4 | Composite video signal (VBS) |
| 5 | Brightness signal (for S-terminal, Y + S) |
| 6 | Chroma signal (for S-terminal, C) |
| 7 | Chroma synchronous signal (CSYNC,75Ω) |
| 8 | Vertical synchronous signal (VSYNC,TTL) |
| 9 | Horizontal synchronous signal (HSYNC,TTL) |
| 10 | Mode switching signal (1) |
| 11 | Mode switching signal (2) |
| 12 | Power supply voltage (5 V) |
| 13 | Power supply voltage (12 V) |
| 14 | Left audio signal (LEFT) |
| 15 | Right audio signal (RIGHT) |
| 16 | Grounding for audio |
| Shield | Grounding |

Types of signals to be output from the video game player are explained in Table 1. From the contact pins with pin Nos. 1 to 3, the red, green, and blue video signals are respectively output . However, the red, green, and blue video signals may use signaling systems that differ between the television set and personal computer.

the video game player according to the embodiment identifies the signaling system compatible with the display unit 27, based on the type of connection cable 24, and uses only the signaling system compatible with the display unit 27, as explained later.

That is to say, the red, green and blue video signals are output by the NTSC or PAL signaling system if the television video receiver is connected, or by the VGA signaling system if the display unit of the personal computer is connected.

The composite video signal for the television video receiver is output from the contact pin with pin No. 4. The composite video signal is generated by adding a blanking signal to the red, green and blue video signals and superimposing the synchronous signal on these signals.

A brightness signal containing a synchronous signal to be input to the S-terminal of a television video receiver is output from the contact pin with pin No. 5, and the chroma signal to be input to the S-terminal of the television video receiver is output from the contact pin with pin No. 6. The red, green, and blue video signals output from the contact pins with pin Nos. 1 to 3 and the composite video signals from the contact pins with pin Nos. 4 to 6 are not simultaneously output because the output is switched within the video game player 21.

The chroma synchronous signal is output from the contact pin with pin No. 7. The chroma synchronous signal is used as a reference signal for detecting the carrier chrominance signal that has been orthogonally modulated, and is called the "color burst signal." The matching impedance of the chroma synchronous signal is 75 Ω.

The vertical synchronous signal and horizontal synchronous signal are output from the contact pins with pin Nos. 8 and 9, respectively. The vertical synchronous signal is output each time a field is scanned, and a horizontal synchronous signal is output for each horizontal scanning. These synchronous signals are signals at the TTL level.

The contact pins with pin Nos. 10 and 11 are used as the mode switching terminals (1) and (2), and the mode switching terminals (1) and (2) are pulled up to +5V in the video game player 21. When the connection cable 24 is connected to the video game player connector 22, an event may occur where the mode switching terminal (1) or (2) is at ground potential, and the terminal is switched to any of the three signaling modes listed in Table 2, as explained later.

TABLE 2

| Mode switching signal (1) Pin 10 | Mode switching signal (2) Pin 11 | Output |
|---|---|---|
| 0 | 0 | RGB signal (VGA) for the personal computer |
| 0 | 1 | Undefined |
| 1 | 0 | RGB signal for the television set |
| 1 | 1 | Composite video signal for the television set |

Referring to Table 2, the case where the mode switching signal is "0" indicates that the mode switching terminal is at ground potential because the conductive pin corresponding to the video game player side cable connector 23 connected to the video game player is grounded.

On the other hand, the case where the mode switching signal is "1" indicates that the mode switching terminal remains at the voltage level of +5V because the conductive pin corresponding to the video game player side cable connector 23 is removed, even when the connection cable 24 is connected to the video game player connector 22.

In the video game player according to the embodiment of the present invention, as listed in Table 2, the RGB signal for the personal computer is output from the video game player connector 22, when the mode switching signals (1) and (2) are "0, 0", i.e., when the video game player connecting the connector 23 with the grounded conductive pins 10 and 11 are connected to the video game player connector 22.

When the mode switching signals (1) and (2) are "1, 0", i.e., when the video game player connecting the connector 23 with the conductive pin 10 removed and the contact pin 11 grounded is connected to the video game player connector 22, the RGB signal for the television set is output from the video game player connector 22.

When the mode switching signals (1) and (2) are "1, 1", i.e., when the video game player connecting the connector 23 with the conductive pins 10 and 11 removed is connected to the video game player connector 22, the composite video signal for the television set is output from the video game player connector 22.

In this embodiment, the signal to be output from the video game player connector 22 is undefined when the mode switching signals (1) and (2) are "0, 1".

Referring back to Table 1, other signals are explained. The contact pins 12 and 13 are connected to the power supply voltages +5V and +12V, respectively. The contact pins 14, 15, and 16 are connected, respectively, to the left audio signal, the right audio signal, and the audio ground terminals. The connector case is grounded for shielding.

Figure 3:
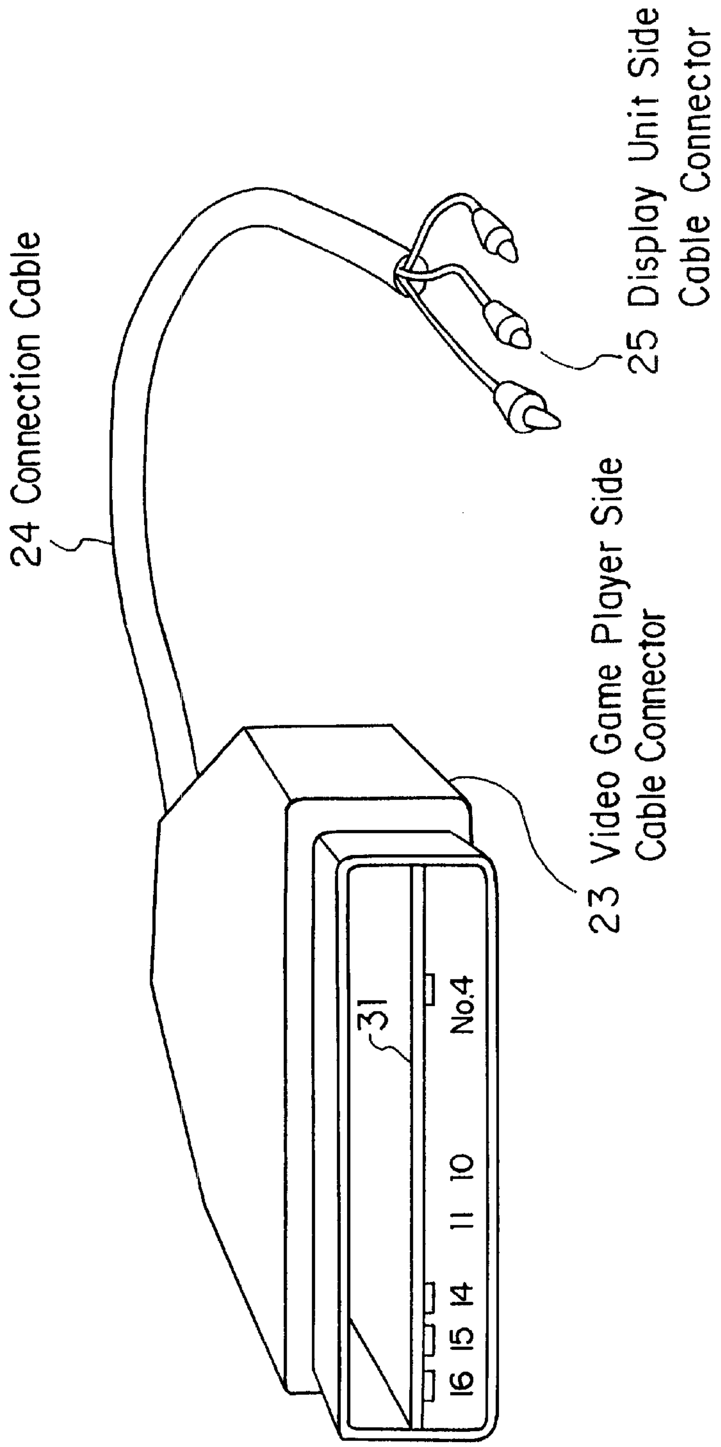
FIG. 3 is a schematic view of a connection cable for the video game player of an embodiment according to the present invention.

FIG. 3 is an example of a schematic view of the connection cable 24 of the video game player of an embodiment according to the present invention. The connection cable 24 includes the video game player side cable connector 23 and the display unit side cable connector 25.

The video game player side cable connector 23 has conductive pins on the lower surface of the printed circuit board 31, and the corresponding pins of these pins come into contact with each other when the video game player side cable connector 23 is connected to the video game player connector 22. However, the conductive pins of the video game player side cable connector 23 can identify the type of the connection cable 24, based on the combination of conductive pins 10 and 11 as previously explained, and the conductive pins, to which the signals required for the display unit 27 to be connected are output, are mounted, and the unused conductive pins are removed.

According to the example of FIG. 3, the conductive pins 10 and 11 are removed, so even when the video game player side cable connector 23 is connected to the video game player connector 22, the potential of the contact pin 10 or 11 of the video game player connector 22 is unchanged. That is, the potentials of the contact pins 10 and 11 of the video game player connector 22 are pulled up to the power supply voltage of +5V within the video game player 21, so even when the video game player side cable connector 23 with the corresponding conductive pins removed is connected to the video game player connector 22, the contact pins 10 and 11 of the video game player connector 22 remain "1, 1".

Therefore, the connection cable 24 corresponds to the case where the mode switching signals (1) and (2) in Table 2 are "1, 1," wherein the composite video signal for the television image receiver is output from the conductive pin 4 and the left/right audio signals are output from the conductive pins 14 and 15. These signals are output from the display unit side cable connector 25 to the display unit 27.

As explained above, according to the embodiments of this invention, the simple mechanism of arranging the conductive pins can identify the connection cable type, and the ROM containing the ID need not be installed together with the connection cable. In addition, no communication for identifying the connection cable with the video game play 21 need be performed, so the identification means or tool can be configured at low cost.

Figure 4:
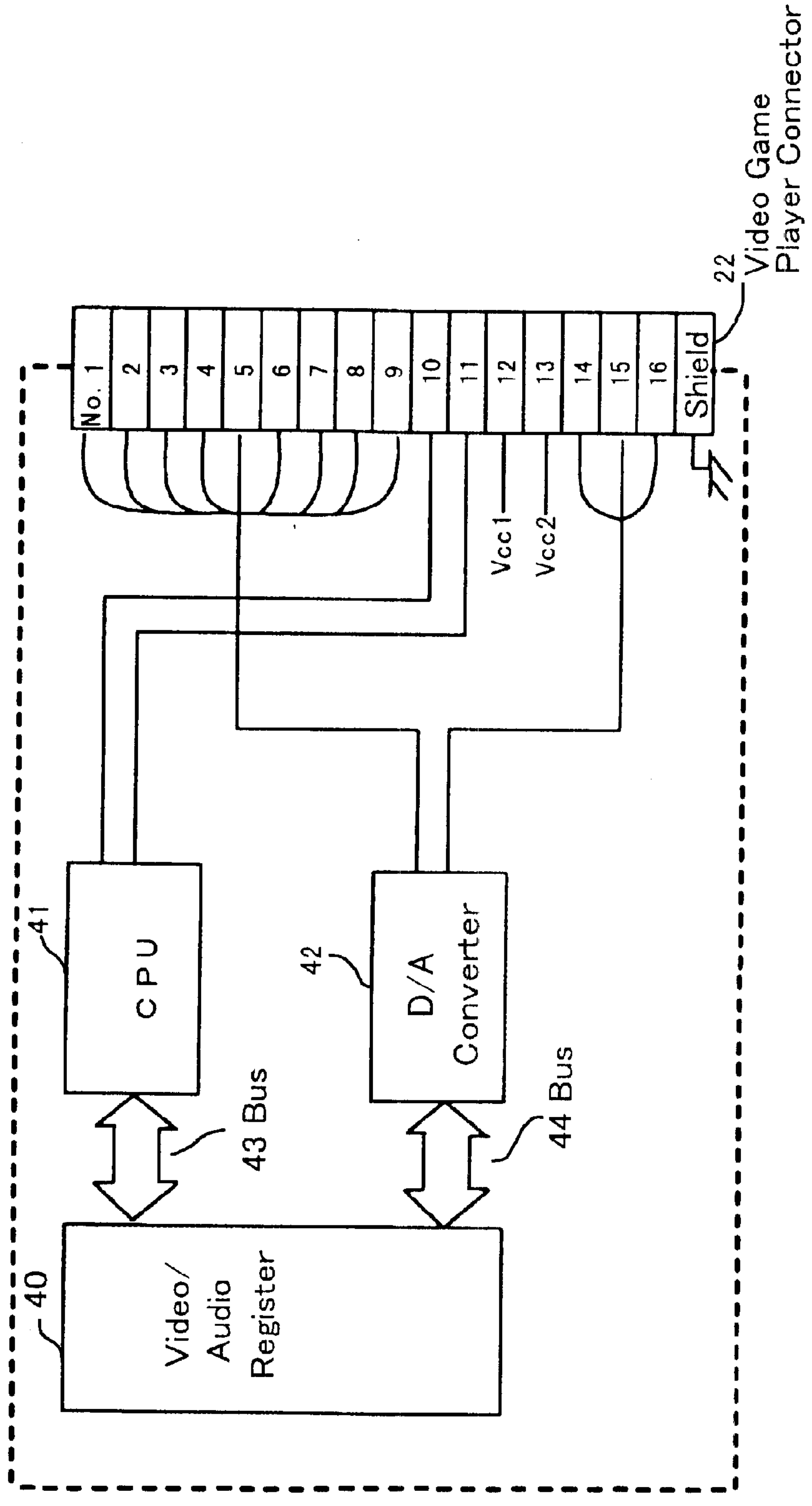
FIG. 4 is a block diagram of a video game player console of an embodiment according to the present invention.

FIG. 4 is a block diagram of the video game play 21 according to the present invention. The CPU 41 is connected to the contact pins 10 and 11 of the video game play connector 22, and identifies the type of the connection cable 24 to be connected to the video game play connector 22. The video/audio register 40 is connected to the CPU 41 through the bus 43, and generates a video signal or audio signal compatible with the display unit, which has been identified by CPU 41. The D/A converter 42 is connected to the video/audio register 40 through the bus 44, and converts the video signal and audio signal into analog signals and outputs the signals from the video game player connector 22 to the connection cable 24.

Figure 5:
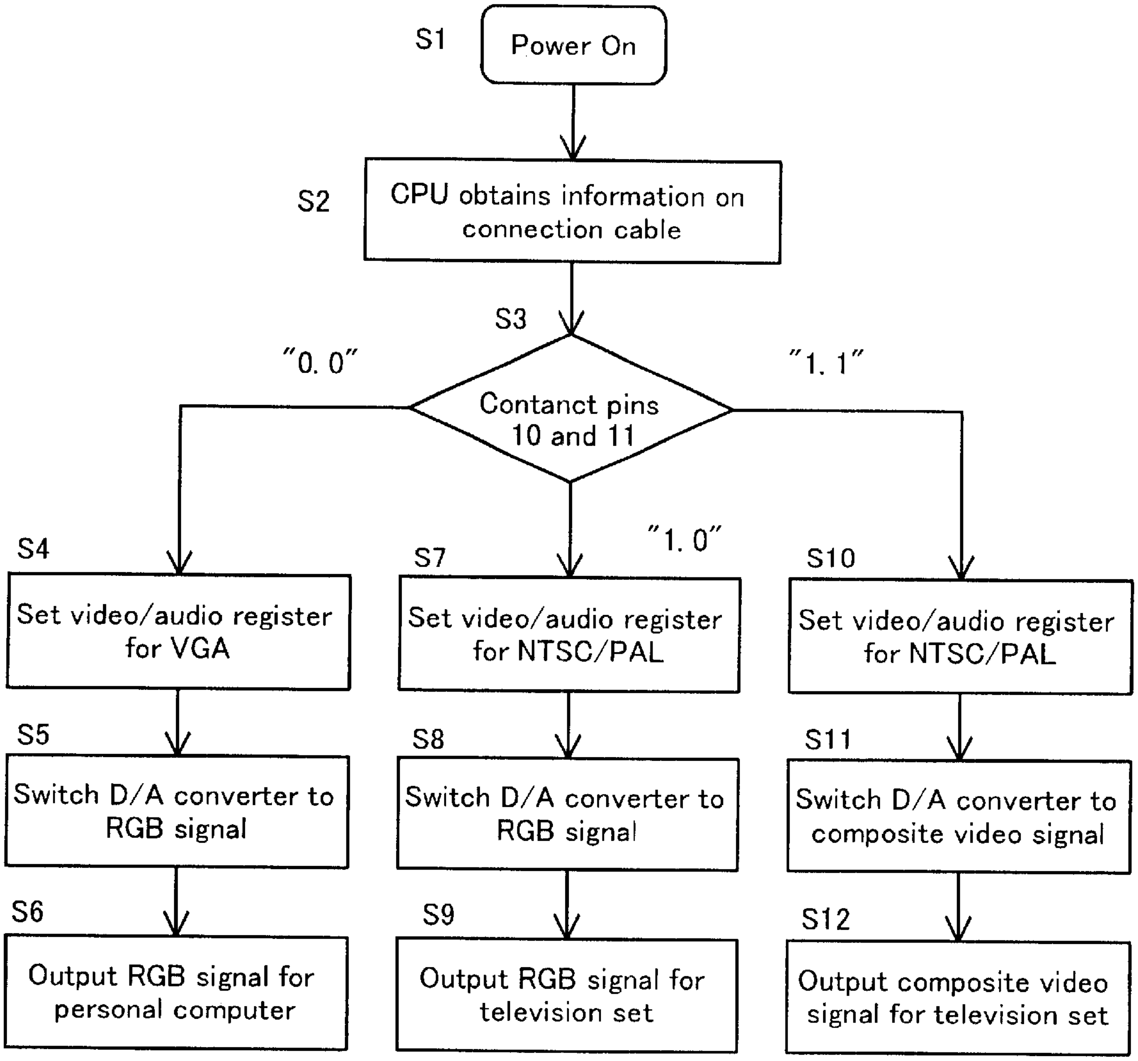
FIG. 5 is a flowchart showing a flowchart of a switching mode of the video game player of an embodiment according to the present invention.

Then, the procedure by which the CPU 41 switches the output mode depending on the type of the connection cable 24 will now be explained by referring to the flowchart in FIG. 5. If the power supply of the video game player is turned on (Step 1), CPU 41 obtains information on the connection cable 24 connected to the video game player connector 22 (Step 2) and examines the potential of the contact pins 10 and 11 of the video game player connector 22 (Step 3).

As a result, when the potentials of the contact pins 10 and 11 are "0, 0," CPU 41 sets the video/audio register 40 so that the VGA signal for the display unit of the personal computer can be output from video/audio register 40 (Step 4). Then, CPU 41 switches the D/A converter 42 to correspond to the RGB signal (Step 5) and outputs the RGB signal for the personal computer from the video game player connector 22 (Step 6).

On the other hand, in step S3, when the potentials of the contact pins 10 and 11 are "1, 0," CPU 41 sets the video/audio register 40 so that the video signal of the NTSC or PAL signaling system is output from the video/audio register 40 (Step 7). Then, the CPU 41 switches the D/A converter 42 so that it corresponds to the RGB signal (Step 8) and outputs the RGB signal for the television set from the video game play connector 22 (Step 9).

In step S3, when the potentials of the contact pins 10 and 11 are "1, 1," the CPU 41 sets the video/audio register 40 so that the audio signal of the NTSC or PAL signaling system is output from the video/audio register 40 (Step 10). Then, the CPU 41 switches the D/A converter 42 so that it corresponds to the composite video signal (Step 11) and outputs the composite video signal for the television set from the video game play connector 22 (Step 12).

As explained above, the video game player in the embodiments of this invention determines the signal compatible with the display unit, based on the connection cable type, and generates and outputs only the signals to be used so that the video game player can prevent beforehand power consumption caused by generating unused signals and increased noise levels.

In the embodiments of this invention, the connection cable type identification and signal switching is performed when the power supply is turned on, but the connection cable type verification can be performed at a specific timing even after the power supply is turned on. By regularly verifying the connection cable type, the user can change the signal output from the video game player to a signal compatible with the display unit even if the user changes the display unit during the playing of a video game. This enhances serviceability for the user.

Figure 6:
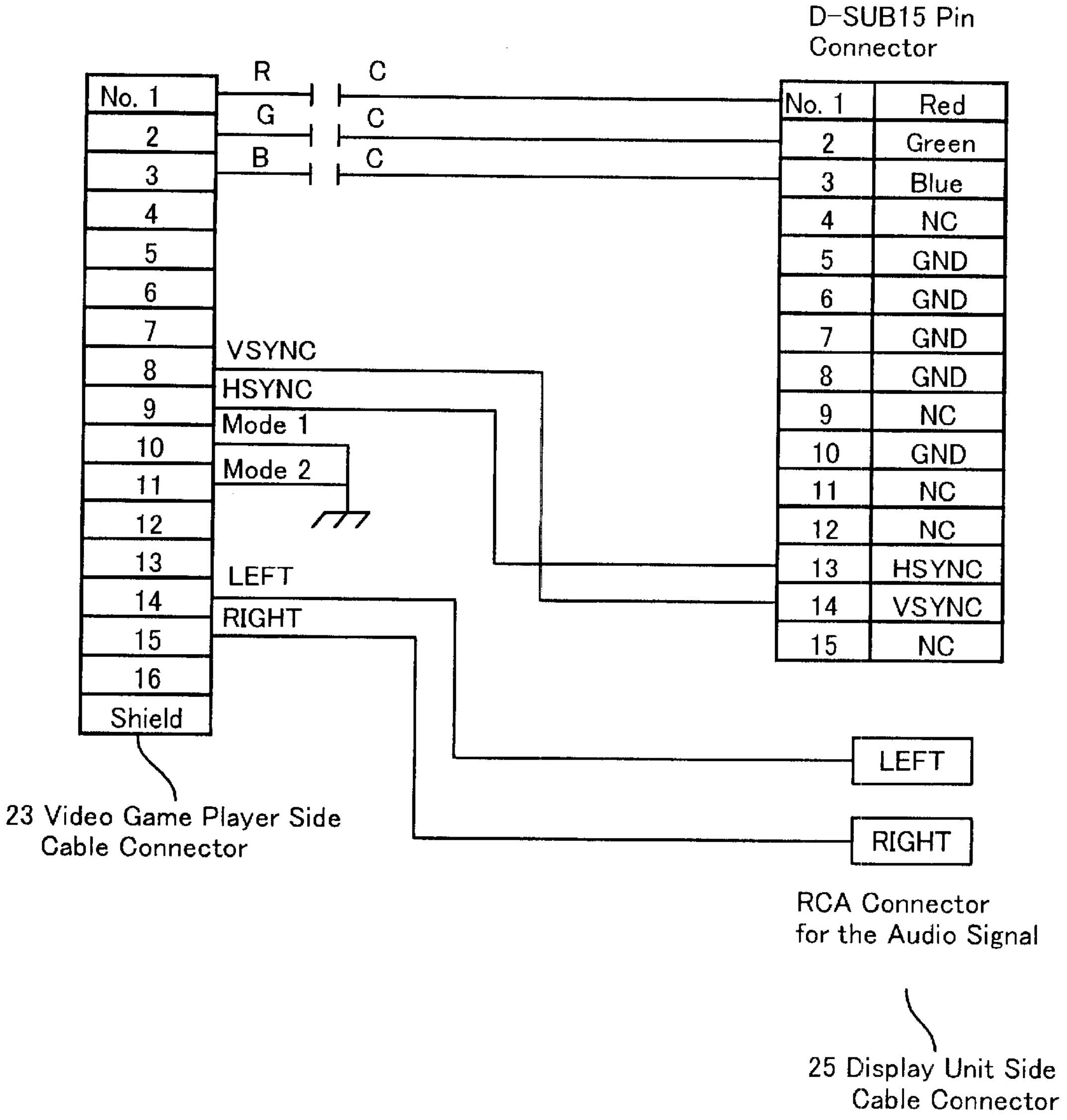
FIG. 6 is a drawing showing the connection by a connection cable for a personal computer of an embodiment according to the present invention.

FIG. 6 is a drawing showing connection by the connection cable for the personal computer according to the present invention. When the conductive pins 10 and 11 of the video game player side cable connector 23 are grounded and the video game player side cable connector 23 is connected to the video game connector 22, the CPU 41 (see FIG. 4) of the video game player 21 recognizes that the mode switching signals (1) and (2) are "0, 0".

After this recognition, the CPU 41 outputs the RGB signal for the personal computer from the conductive pins 1 to 3, the vertical and horizontal synchronous signals from the conductive pins 8 and 9, and the left and right audio signals from the conductive pins 14 and 15. The conductive pins unused by the video game player side cable connector 23 are removed for reducing costs.

The RGB signals output from the conductive pins 1 to 3 are output through a coupling capacitor C, and as the display unit side cable connector 25, the D-SUB15 pin connector is used for the video signal, and the RCA connector for the audio signal.

Figure 7:
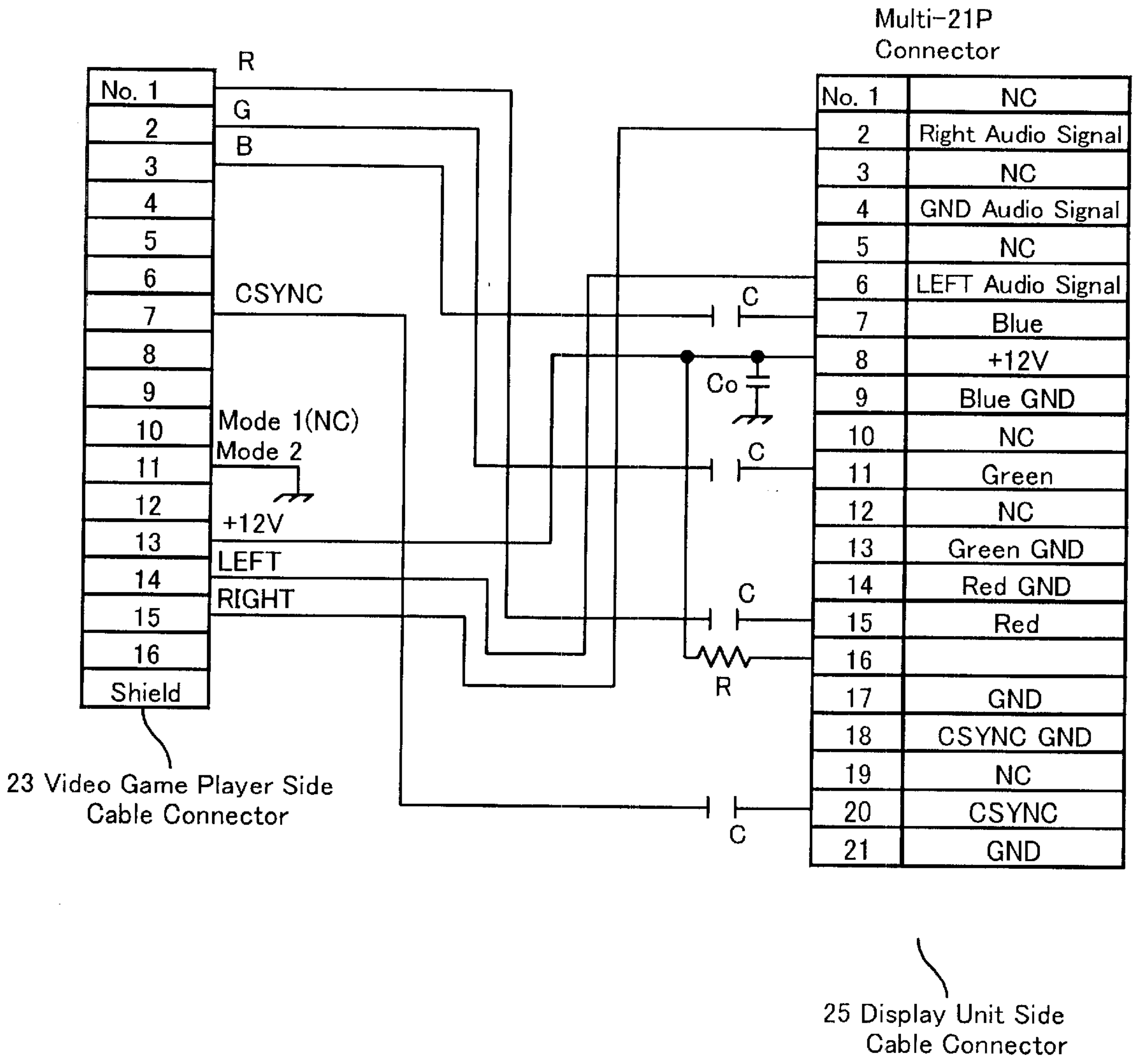
FIG. 7 is a drawing showing the connection by a RGB21P connection cable for a television set of an embodiment according to the present invention.

FIG. 7 is a drawing showing connection by the RGB21P connection cable for the television set according to the present invention.

The conductive pin 10 of the video game player side cable connector 23 is removed and the conductive pin 11 is grounded. Therefore, when the video game player side cable connector 23 is connected to the video game player connector 22, the CPU 41 of the video game player 21 recognizes that the mode switching signals (1) and (2) are "1, 0".

After this recognition, the CPU 41 outputs the RGB signal for the television set from the conductive pins 1 to 3, the chroma synchronous signal from the conductive pin 7, and the left and right audio signals from the conductive pins 14 and 15. Also, the CPU 41 outputs the voltage of +12V from the conductive pin 13. In this example, the conductive pins unused by the video game player side cable connector 23 are removed.

The RGB signals output from the conductive pins 1 to 3 and the chroma synchronous signal output form the conductive pin 7 are output through the coupling capacitor C, and the multi-21P connector is used as the display unit side cable connector 25. Also, the smoothing capacitor C0 is connected to the display unit side cable connector 25, and the resistor R pulled up to +12V is connected to the conductive pin 16.

Figure 8:
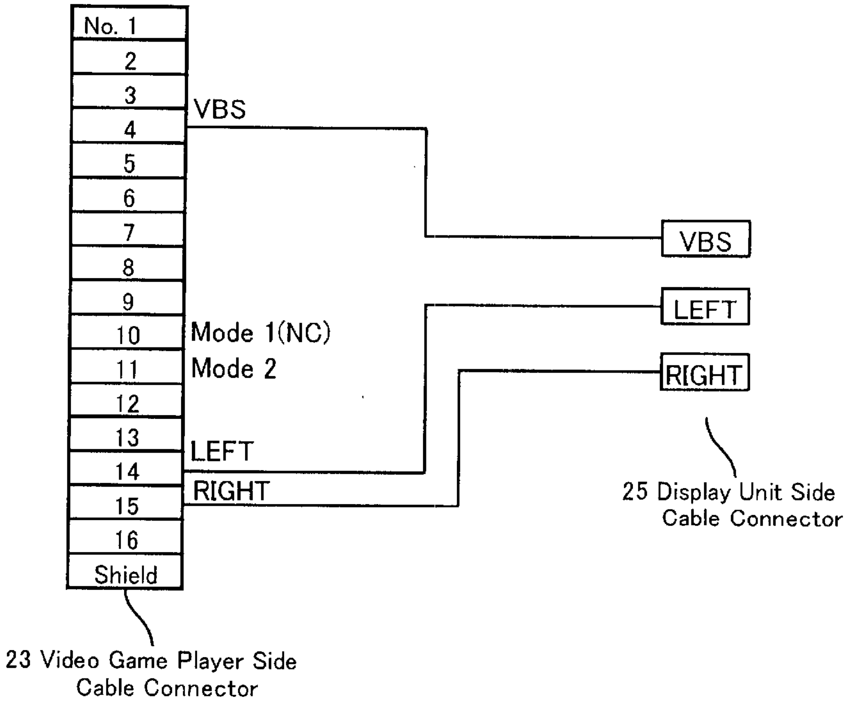
FIG. 8 is a drawing showing the connection by an AV stereo cable for a television set of an embodiment according to the present invention.

FIG. 8 is a connection drawing of the AV stereo cable for the television set according to the present invention. When the conductive pins 10 and 11 of the video game player side cable connector 23 are removed and the video game player side cable connector 23 is connected to the video game player connector 22, the CPU 41 of the video game player 21 recognizes that the mode switching signals (1) and (2) are "1, 1".

After this recognition, the CPU 41 outputs the composite video signal for the television set from the conductive pin 4, and the left and right audio signals from the conductive pins 14 and 15. The video game player 21 is most frequently used by connecting the AV stereo cable for the television set, but all the conductive pins unused by the video game player side cable connector 23 are removed. Therefore, three conductive pins are used for the AV stereo cable with the greatest frequency of use. This contributes to reduce costs.

Figure 9:
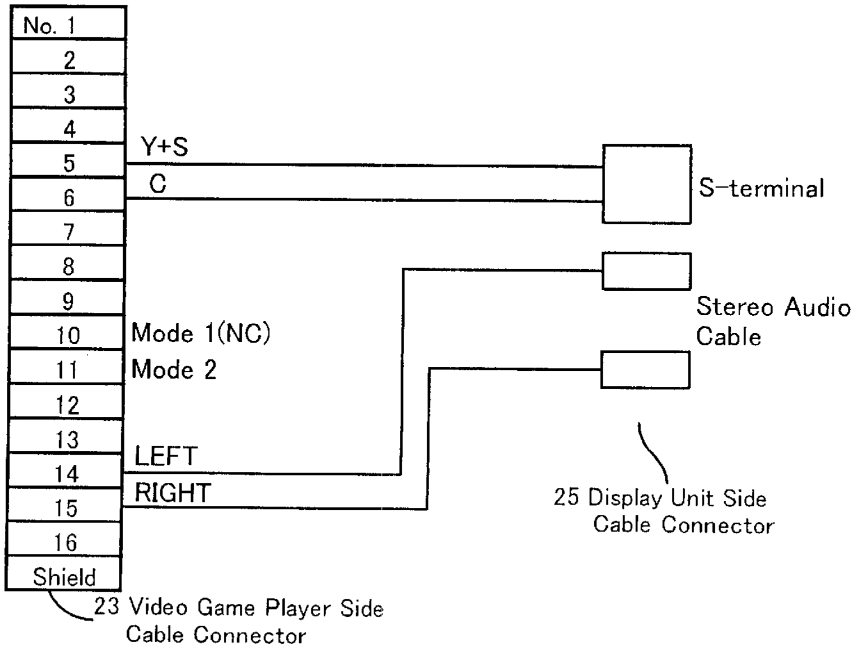
FIG. 9 is a drawing showing the connection by an S-terminal and stereo audio cable for a television set of an embodiment according to the present invention.

FIG. 9 is a drawing showing connection by a S-terminal and stereo audio cable for the television set according to an embodiment of this invention. When the conductive pins 10 and 11 of the video game player side cable connector 23 are removed and the video game player side cable connector 23 is connected to the video game player connector 22, the CPU 41 of the video game player 21 recognizes that the mode switching signals (1) and (2) are "1, 1".

After this recognition, the CPU 41 outputs the brightness signal for the television set from the conductive pin 5, the chroma signal for the television set from the conductive pin 6, and the left and right audio signals from the conductive pins 14 and 15. In the display unit side cable connector 25, the brightness signal and chroma signal are output as video signals from the S-terminal. Also, in this embodiment, the conductive pins unused by the video game player side cable connector 23 are removed.

Figure 10:
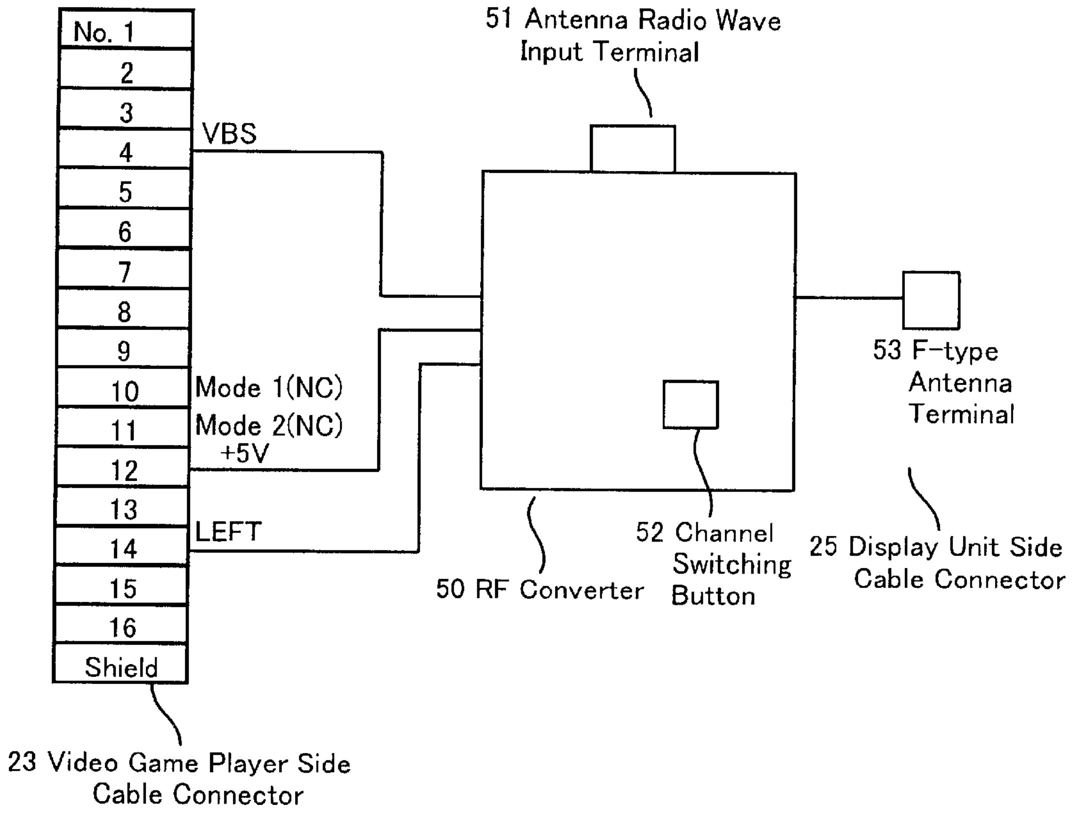
FIG. 10 is a drawing showing a cable with an RF converter for the television set of an embodiment according to the present invention.

FIG. 10 is a drawing showing connection by a cable with the RF converter for the television set according to the present invention. When the conductive pins 10 and 11 of the video game player side cable connector 23 are removed and the video game player side cable connector 23 is connected to the video game player connector 22, the CPU 41 of the video game player 21 recognizes that the mode switching signals (1) and (2) are "1, 1".

After this recognition, the CPU 41 outputs the composite video signal for the television set from the conductive pin 4, and the left and right audio signals from the conductive pins 14 and 15. The composite video signal is output to the RF converter 50 and converted into a high-frequency signal. However, an F-type antenna terminal 53 is used and connected as the display unit side cable connector 25. Also, the channel switching button 52 for selecting an idle channel on the television video receiver, as well as the antenna radio wave input terminal 51 are set in the RF converter 50.

Figure 11A:
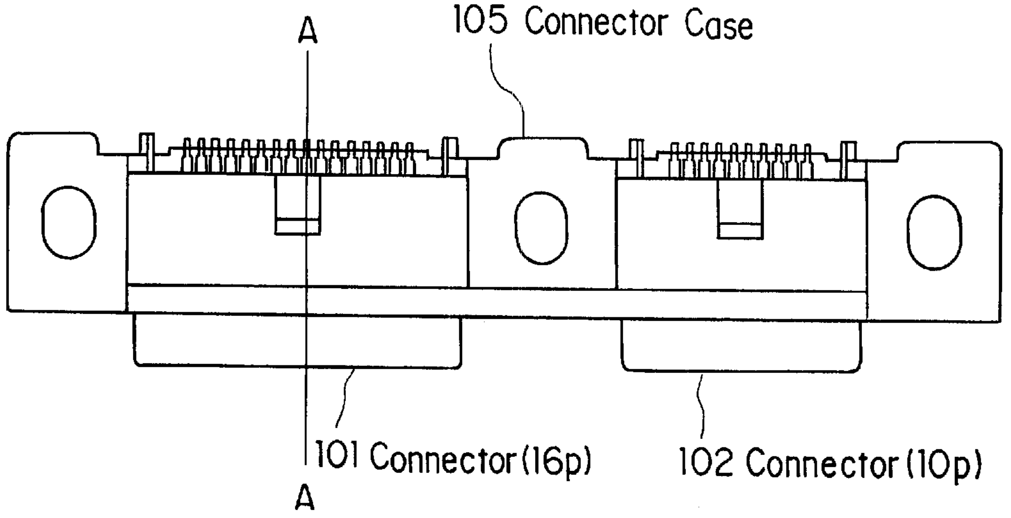
FIGS. 11A and 11B are drawings showing the external appearance of a connector according to the present invention.
Figure 11B:
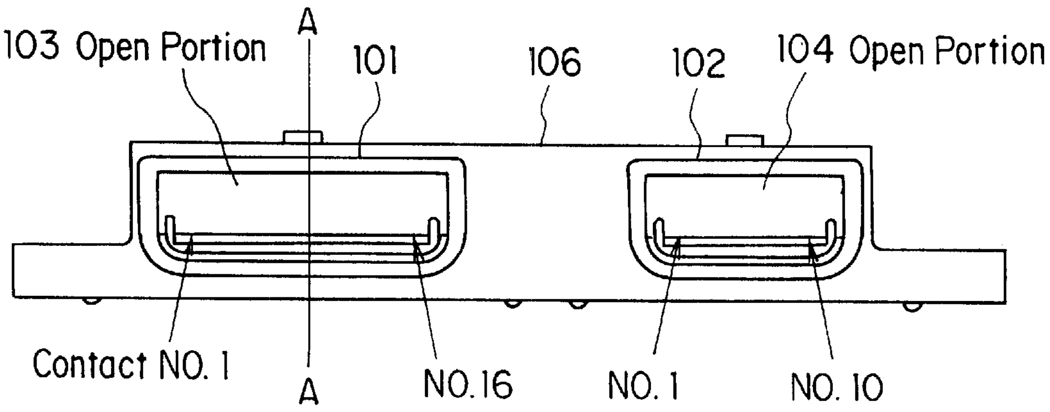

Then, the electrostatic-shielded connector according to the present invention is explained by referring to the drawings. FIG. 11 is a drawing of the connector according to an embodiment of this invention, and FIG. 11A is the top view and FIG. 11B is the front view. In FIG. 2 and others, the single video game player connector 22 is shown. The coupling-type connectors 101 to be used for the video game player and 102 are shown in FIG. 11.

The connector case 105 contains a connector 101 with 16 contact pins and a connector 102 with 10 contact pins. The contact pins 1 to 16 are set in the open portion 103 of the connector 101, and the contact pins 1 to 10 are set in the open portion 104 of the connector 102.

Figure 12:
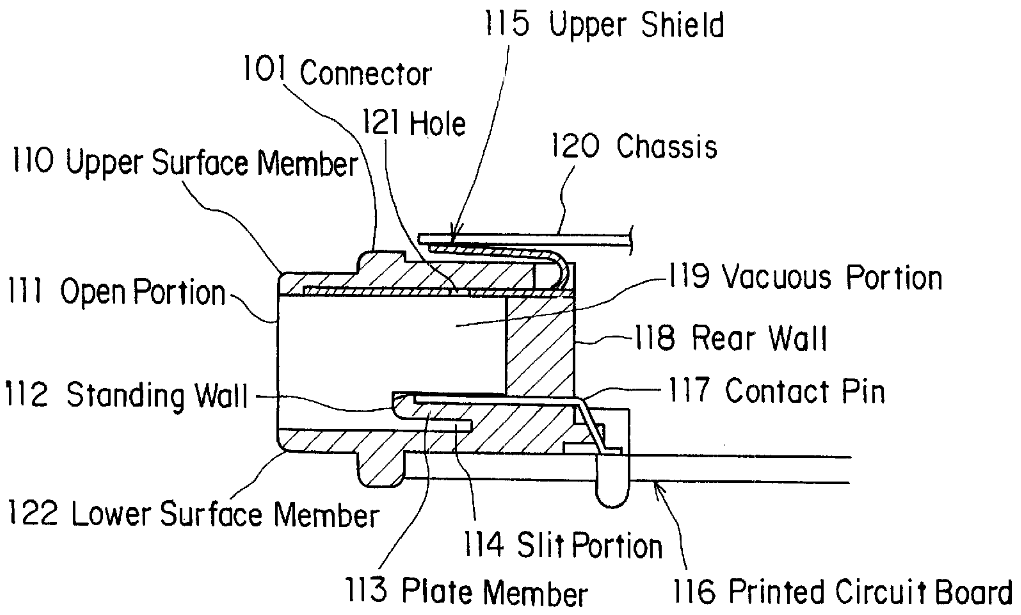
FIG. 12 is a cross-sectional view of the connector of FIGS. 11A and 11B along line A—A according to the present invention.

FIG. 12 is a cross-sectional view of the connector mounted on the printed circuit board according to an embodiment of this invention, showing the cross-section along the line A—A shown in FIG. 11. The connector 101 is formed with the U-shaped section by the insulator, and has the open portion 111 and the vacuous portion 119, into which the plug is inserted and fitted.

The upper shield 115 is set on the lower surface of the upper surface member 110 of the connector 101, and folded forward at the rear of the upper surface member 110. The upper shield 115 is a metallic spring member, and the folded portion is pressure-welded to one end of the chassis 120, so the upper shield 115 bears the potential with respect to ground. A hole 121 is formed on the upper shield 115, into which the projections of the plug to be inserted into the vacuous portion 119 are fitted, and which function as a half lock for the plug.

The rear of the vacuous portion 119 is partitioned by the rear wall 118, and the plate member 113 is set in parallel with the printed circuit board 116 in the direction from the rear wall 118 to the open portion 111. The length of the plate member 113 is about half the distance from the rear wall 118 to the open portion 111, and a standing wall 112 is set in the end of the plate member 113, almost perpendicular to the plate member 113.

A contact pin 117 is mounted on the upper surface of the plate member 113, and connected to the conductive pattern of the printed circuit board 116 by piercing through the rear wall 118. The end of the contact pin 117 is stopped at the rear end of the standing wall 112.

As explained above, the connector 101 in the embodiment can obtain sufficient separation via insulation from the opening portion 111, because the contact pin 117 is positioned at the rear of the vacuous portion 119. If a foreign substance is mistakenly inserted into the open portion 111, it is difficult for the foreign substance to come into direct contact with the contact pin 117 because of its abutting the standing wall 112. This enables the prevention of the destruction of semiconductor devices, and prevents abnormal operation of the information-processing unit caused by discharged static electricity.

When a plug is inserted into the connector 101, the conductive pin connected to the signal cable within the plug comes into contact with the contact pin 117 elastically, enabling the transmission of a signal. The slit portion 114 between the plate member 113 and the lower surface member 122 is used as a guide for inserting the plug into the connector 101.

Figure 13:
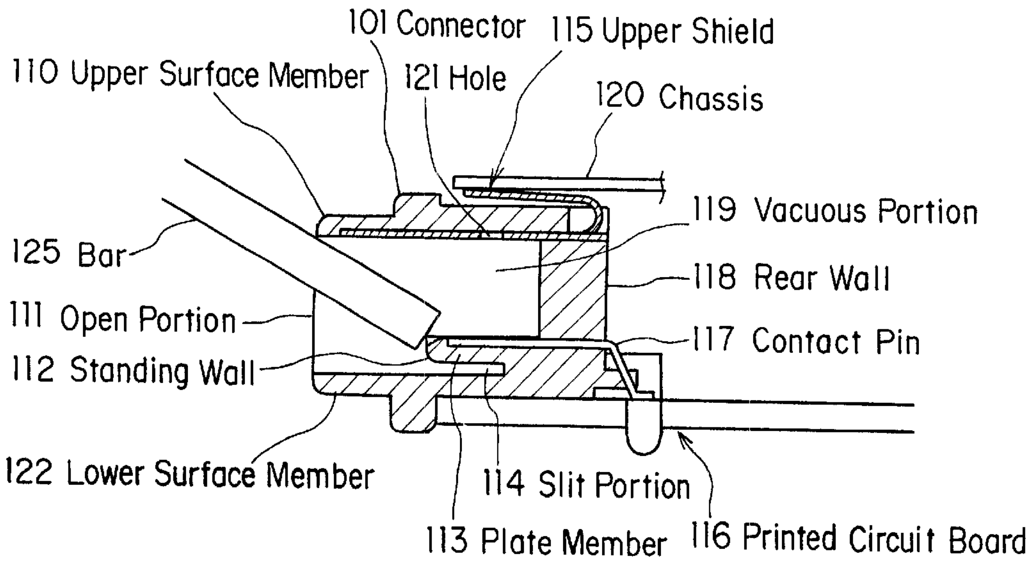
FIG. 13 is an explanatory drawing of the connector of FIGS. 11A and 11B according to the present invention.

FIG. 13 is an explanatory drawing of the connector when a foreign substance such as a metal bar 125 is mistakenly inserted into the connector 101 in this embodiment.

For the connector 101 in this embodiment, the standing wall 112 is set at the front of the contact pin 117, so it is difficult for the bar 125 to come into direct contact with the contact pin 117 because it is blocked by the standing wall 112. Therefore, even if the bar 125 is charged with static electricity, the static electricity may not destroy the insulated state of the semiconductor devices.

In addition, insulation equivalent to the thickness of the standing wall 112 can be secured between the bar 125 and the contact pin 117. Therefore, no static electricity is discharged between the bar 125 and the contact pin 117. This prevents abnormal operation of electronic circuits caused by discharged static electricity.

FIGS. 14A and 14B are drawings of the plug according to an embodiment of this invention. FIG. 14A is the top view and FIG. 14B is the front view. The connection cable 139 is drawn into the cap 131 of the plug 130 and connected to the conductive pin 136 as the contact terminal for the plug 130.

The plug 130 shown in FIGS. 14A, 14B is the plug that is inserted into the 16-pin connector 101 shown in FIG. 11, and has conductive pins 136 with pin Nos.1 to 16. The shield 129 to be inserted into the connector 101 is set at the front of the cap 131, and the projections 134, which are fitted into the holes 121 of the upper shield 115 and function as a half lock, are formed on the upper surface of the shield 129.

Figure 14:
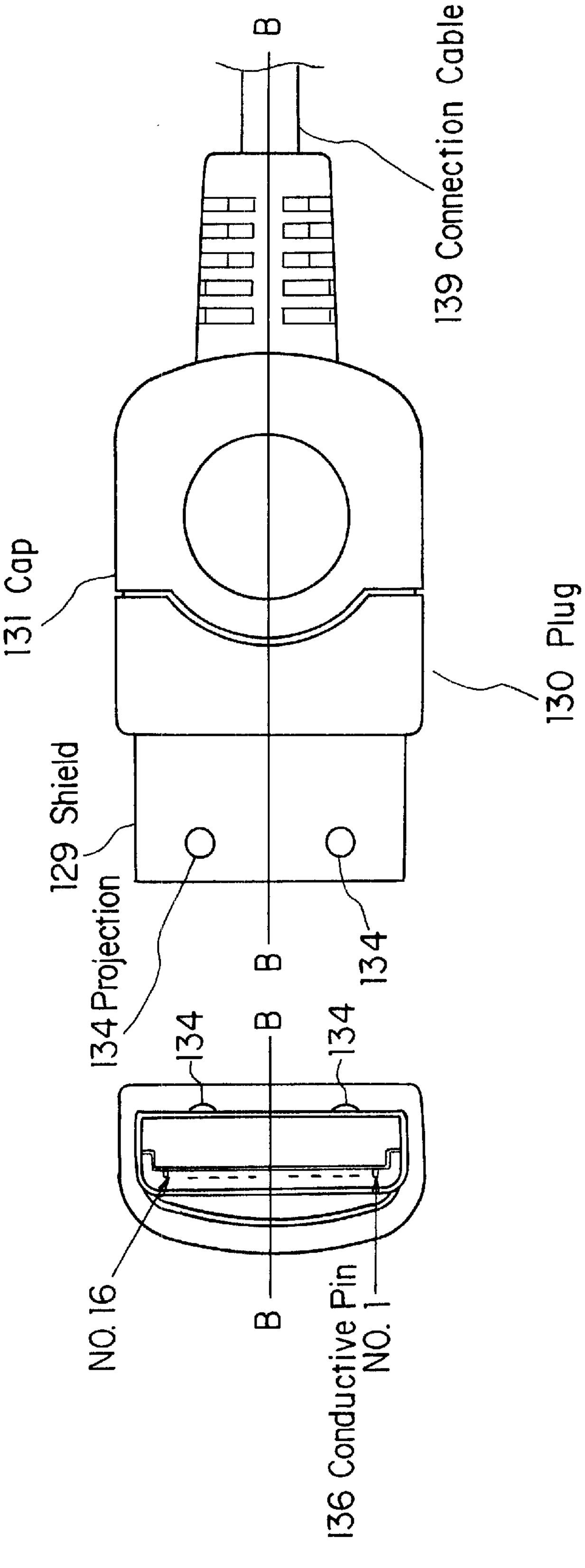
FIG. 14 is a drawing of a plug of an embodiment according to the present invention.
Figure 15:
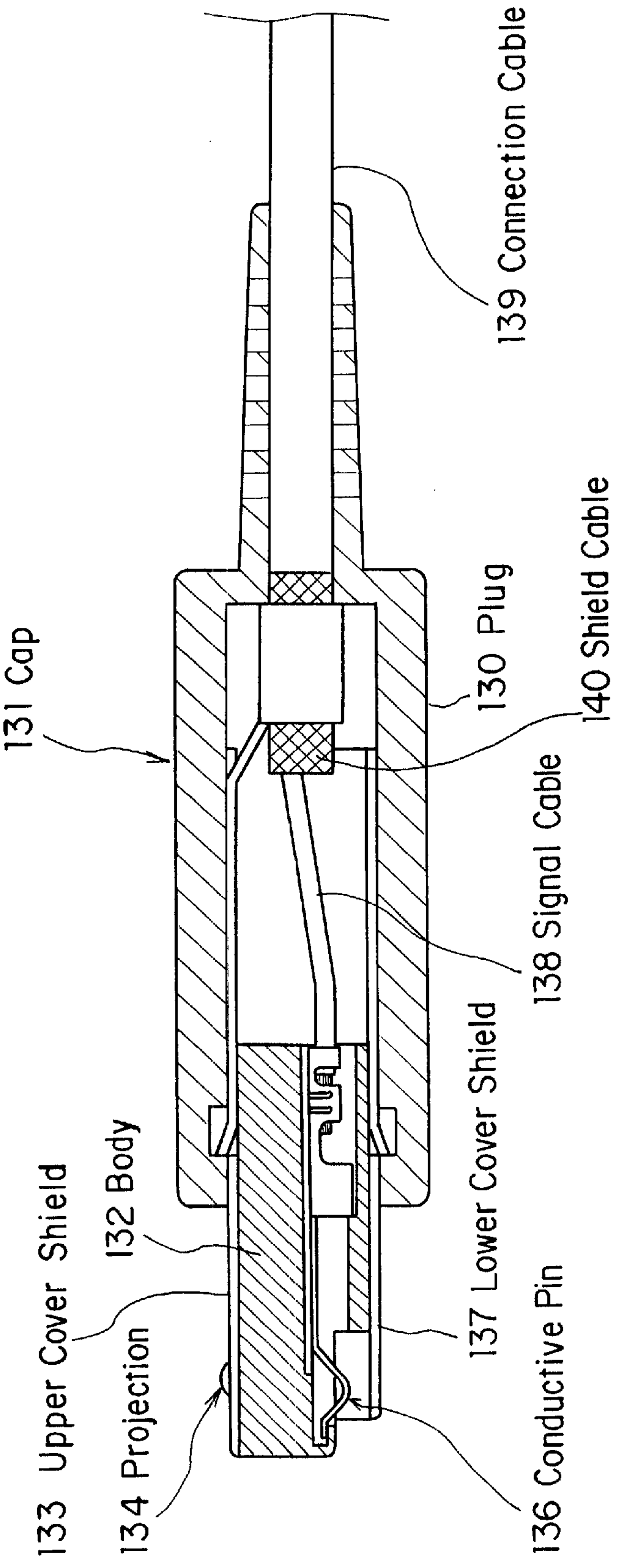
FIG. 15 is a cross-sectional view of the plug of FIG. 14 along line B—B according to the present invention.

FIG. 15 is a cross-sectional view of the plug according to the present invention, and shows the cross section along the line B—B in FIG. 14. The connection cable 139 is drawn into the cap 131 and the signal cable 138 of the connection cable 139 is connected to the conductive pin 136.

The body 132 to be inserted into the connector 101 is projected from the front of the cap 131, and the upper cover shield 133 connected to the shield cable 140 of the connection cable 139 is set on the upper surface of the body 132. As explained above, the projections 134 are formed on the upper surface of the upper cover shield 133, which function as a half lock when the plug 130 is inserted into the connector 101.

The conductive pins 136 on the lower surface of the body 132 elastically come into contact with the contact pin 117 of the connector 101 when the plug 130 is inserted into the connector 101.

The lower cover shield 137 connected to the shield cable 140 of the connection cable 139 is set under the conductive pins 136.

Figure 16:
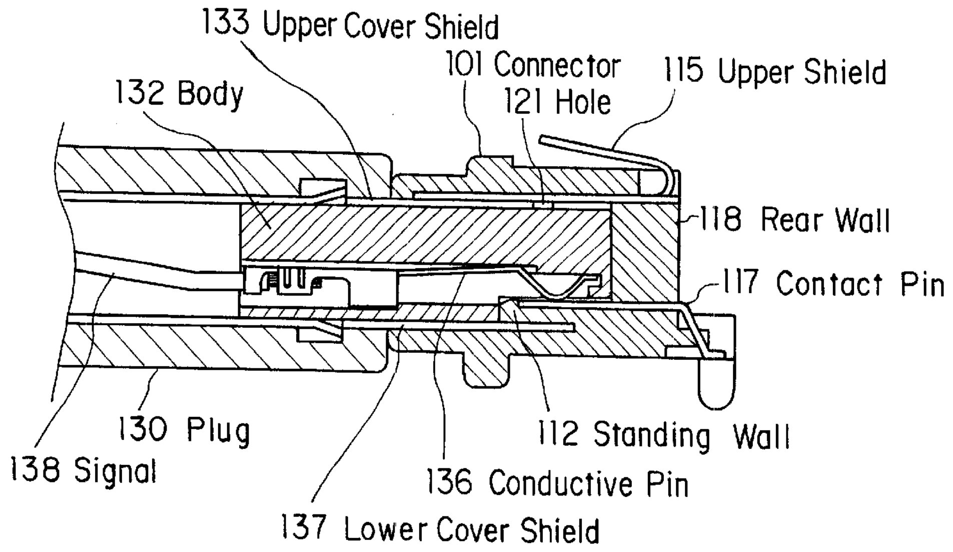
FIG. 16 is a drawing showing the insertion of the plug into the connector of FIGS. 11A and 11B according to the present invention.

FIG. 16 is a drawing of inserting the plug into the connector according to an embodiment of this invention. When the plug 130 is inserted into the connector 101, the conductive pins 136 elastically come into contact with the contact pin 117 for electrical conductivity across the standing wall 112.

When the plug 130 is inserted into the connector 101, the upper cover shield 133 of the plug 130 comes into contact with the upper shield 115 of the connector 101 and surrounds the signal cable 138, conductive pins 136, and contact pin 117 together with the lower cover shield 137 of the plug 130 so as to prevent the introduction of noise from the outside.

As explained above, the connector 101 and plug 130 are half-locked and positioned by holes 121 formed on the upper shield 115 of the connector 101, and the projections 134 formed on the upper cover shield 133 of the plug 130.

Figure 17:
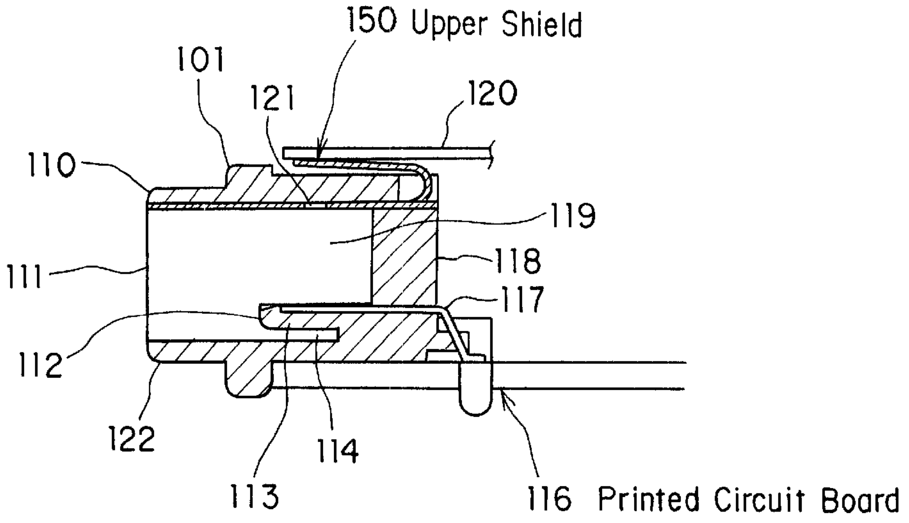
FIG. 17 is a cross-sectional view of the connector along line A—A of other embodiment according to the present invention.

FIG. 17 is a cross-sectional view of the connector according to another embodiment of this invention, and shows the cross section along the line A—A in FIG. 11. In this embodiment, the upper shield 150 of the connector 101 can be extended until it reaches the open portion 111 at the end of the upper surface member 110.

Figure 18:
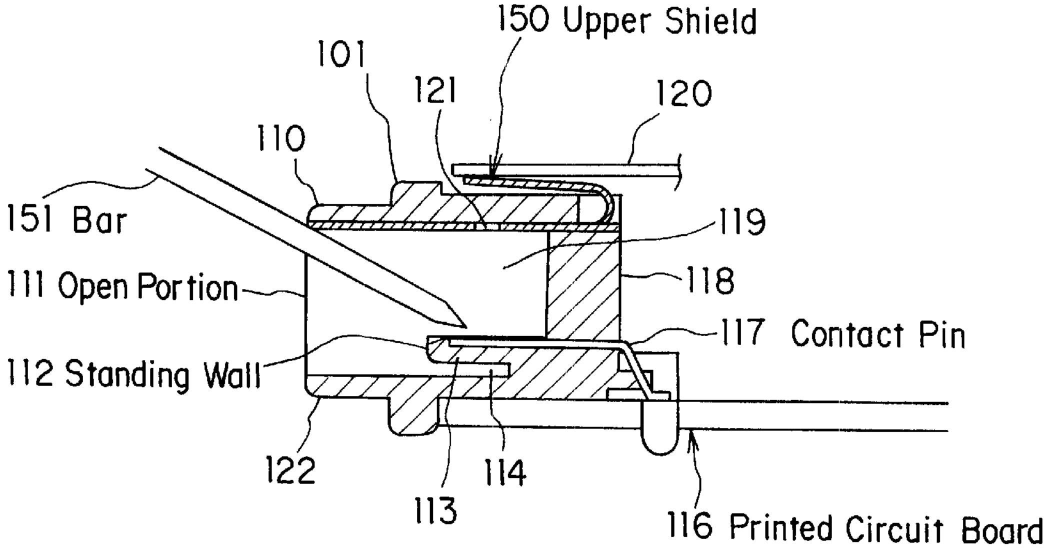
FIG. 18 is an explanatory drawing of a connector of still other embodiment according to the present invention.
Figure 19:
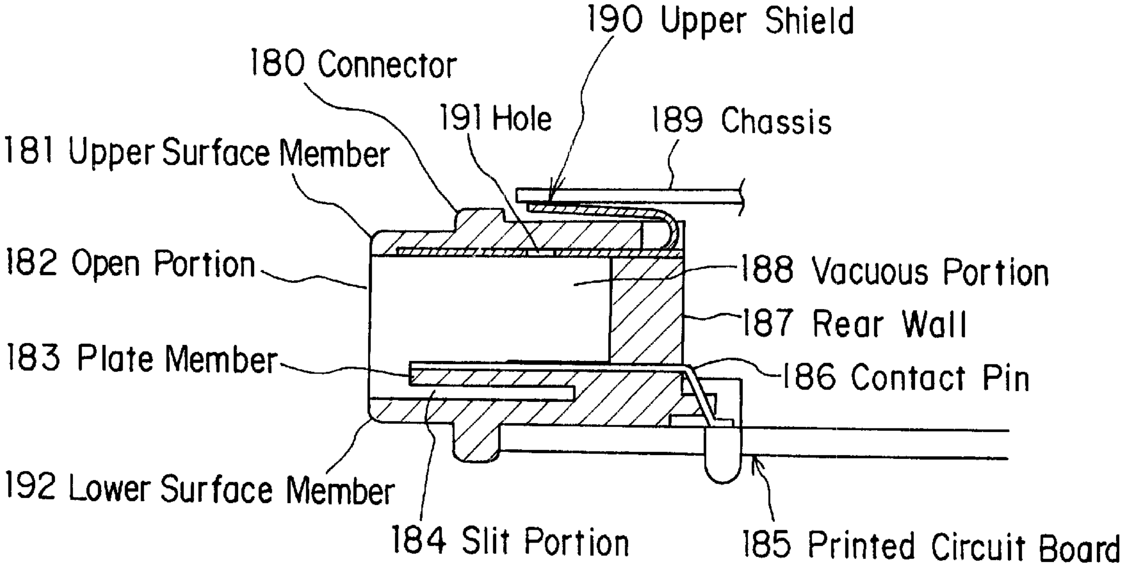
FIG. 19 is a cross-sectional view of a conventional connector.
Figure 20:
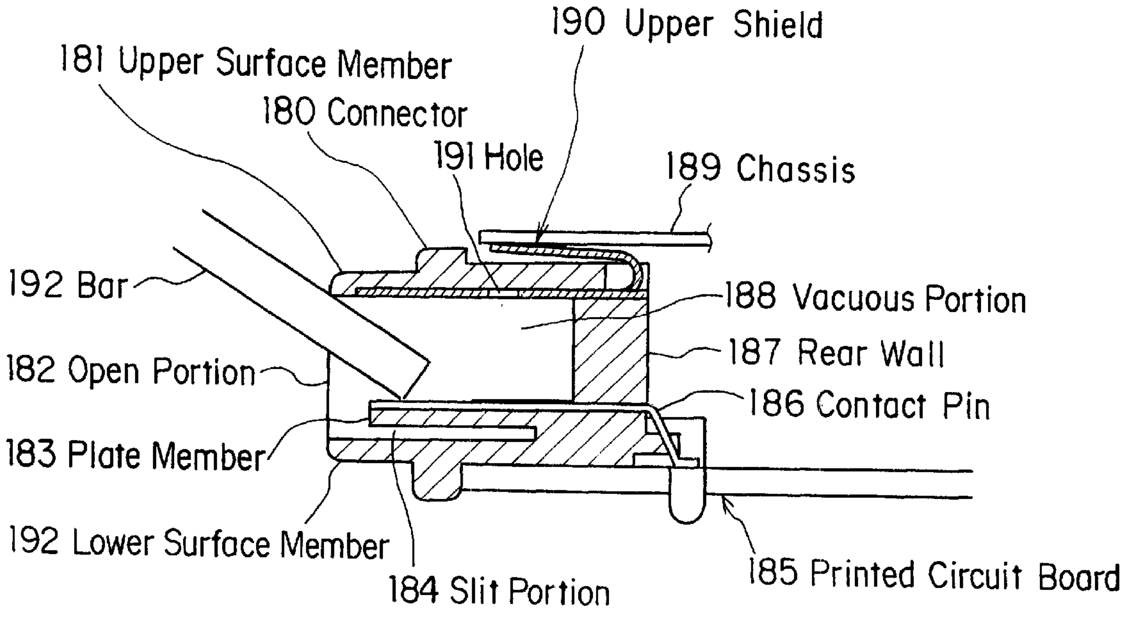
FIG. 20 is an explanatory drawing explaining the conventional connector.

FIG. 18 is an explanatory drawing of the connector when the plug is not inserted into the connector 101 and a foreign substance such as a bar 151 is inserted into the connector 101. If the end of the bar 151 is pointed, the bar 151 may come into contact with the contact pin 117 even if the contact pin 117 is positioned at the rear very far from the open portion 111 and the standing wall 112 is set at the front of the contact pin 117.

Thus, in this embodiment, not only is the standing wall 112 set at the front of the contact pin 117 but also, the upper shield is extended to the end of the upper surface member 110. As a result, even if a pointed bar 151 is inserted from the open portion 111 into the connector 101, the bar 151 comes into contact with the upper shield 150 ahead of the contact pin 117. Therefore, even if the bar 151 is charged with static electricity, the static electricity is discharged to ground and does not destroy the semiconductor devices.

Although the embodiments of the video game player to be connected to the display unit have been explained, they are not to be construed to limit the technical scope of this invention.

For example, this invention can apply to not only the situation where the video and audio signals are output from the video game player but also to the situation where the video game player sends signals to an external unit such as a modem or hard disk. In addition, this invention can identify the external unit to be connected, depending on the connection cable type, as well as prevent abnormal operation caused by discharged static electricity.

Industrial Applicability As explained above, the information-processing unit of this invention senses the state of a specific contact pin in the connector and recognizes the type of connection cable to be accommodated in the connector, enabling the automatic changing of the settings of the information-processing unit to be compatible with the external unit, as well as to reduce the operational burden on the user.

The connection cable of this invention enables the information-processing unit to recognize the type of connection cable, using a simple mechanism for changing the arrangement of the conductive pins. This simplifies the configuration of the information-processing unit.

The connector of this invention has a standing wall in the end of the plate member on its upper surface side, so a foreign substance such as a piece of metal does not come into direct contact with the contact pin even if the foreign substance is mistakenly inserted from the open portion into the connector. This prevents static electricity from passing through the contact pin and destroying the semiconductor devices, or prevents abnormal operation of the information-processing unit.

In addition, the connector of this invention has a shield member covering from the rear wall to the open portion on the lower surface of the upper surface member, so a foreign substance contacts the shield member before contacting the contact pin even if the foreign substance is obliquely inserted in the open portion of the connector. Therefore, even if the foreign substance is charged with static electricity, the static electricity is discharged to ground through the shield member and does not cause destruction of the semiconductor or abnormal operation of the information-processing unit.

What is claimed is:

1. An information-processing unit connected to a specific display unit through a connection cable, comprising:

a first connector having a first plurality of contact pins, including at least one specific contact pin, said first connector accommodating the connection cable; and a controller;

wherein the cable includes a second connector associated with the specific display unit and having a second plurality of contact pins;

the controller senses a state of said at least one specific contact pin to determine the type of said second connector, and causes said information processing unit to output at least some of a plurality of visual subsignals in a format compatible with said specific display unit; and said second connector supplies a visual signal, comprising said at least some of said plurality of visual subsignals, to said specific display unit.

2. The information-processing unit according to claim 1, wherein each of the at least one specific contact pin is set to be in the level of a specific potential when the connection cable is not connected to the specific display unit.

3. A connection cable for connecting an information-processing unit to a specific display unit comprising:

a first end, adapted to be coupled to said information-processing unit using a first connector having a plurality of contact pins, said plurality of contact pins including a set of specific contact pins; and a second end, adapted to be coupled to said specific display unit;

wherein said set of specific contact pins are set to a state corresponding to said specific display unit to permit a controller of said information-processing unit to recognize the type of connection cable and generate a plurality of visual subsignals formatted for said specific display unit; and said second end supplies a visual signal comprising at least some of said plurality of visual subsignals to said specific display unit.

4. The connection cable according to claim 3, further comprising:

a connector at one end with conductive pins arranged as corresponding to a connection cable type.

5. The connection cable according to claim 4, wherein the arrangement of the conductive pins corresponds to a combination of specific pins of the conductive pins corresponding to the connection cable type.

6. A connection cable comprising:

a first end to be connected to a first connector provided in an information-processing unit; and a second end including a second connector, to be connected to a specific display unit, the information-processing unit including, the connector having multiple contact pins, which are connected to the connection cable, and a controller for sensing the state of specific contact pins of the multiple contact pins in the connector and recognizing the type of the connection cable to be accommodated in the connector, adapted to the specific display unit;

wherein a combination of the specific conductive pins correspond to the type of the specific display unit;

wherein information specifying the type of the specific display unit is output to the information-processing unit when the information-processing unit is connected; and wherein said information causes said information-processing unit to format at least some of a plurality of visual subsignals for said specific display unit and output said plurality of visual subsignals on respective ones of said multiple contact pins to produce an video signal for said specific display unit at said second connector.

7. The information-processing unit of claim 1, wherein said controller senses the state of two specific contact pins.

* * * * *